United States Patent [19]
Mann

[11] Patent Number: 5,498,273
[45] Date of Patent: Mar. 12, 1996

[54] PARTICLE SEPARATION

[75] Inventor: Darrell L. Mann, Bristol, England

[73] Assignee: Rolls-Royce, plc, London, England

[21] Appl. No.: 339,206

[22] Filed: Nov. 10, 1994

[30] Foreign Application Priority Data

Nov. 16, 1993 [GB] United Kingdom ............ 9323623

[51] Int. Cl.⁶ ............................................. B01D 45/00
[52] U.S. Cl. .................. 55/396; 55/398; 55/448; 55/456
[58] Field of Search .................. 55/396, 397, 398, 55/448, 450, 456, 457

[56] References Cited

U.S. PATENT DOCUMENTS

| | | | |
|---|---|---|---|
| 1,930,476 | 10/1933 | Hawley | 55/396 |
| 2,712,859 | 7/1955 | Wintermute | 55/396 |
| 3,374,857 | 3/1968 | Hutchins | 55/456 |
| 3,448,563 | 6/1969 | Sobeck | 55/450 |
| 3,713,280 | 1/1973 | Keller et al. | 55/396 |
| 4,141,705 | 2/1979 | Campolong . | |
| 4,180,391 | 12/1979 | Perry, Jr. et al. | 55/396 |
| 4,746,340 | 5/1988 | Durre et al. | 55/450 |
| 4,985,058 | 1/1991 | Prinsloo et al. | 55/396 |

FOREIGN PATENT DOCUMENTS

| | | |
|---|---|---|
| 1465915 | 3/1977 | United Kingdom . |
| 2034600 | 6/1980 | United Kingdom . |
| 2098514 | 11/1982 | United Kingdom . |
| 1201096 | 8/1990 | United Kingdom . |

*Primary Examiner*—C. Scott Bushey
*Attorney, Agent, or Firm*—Oliff & Berridge

[57] ABSTRACT

A vortex tube including an annular downstream scavenge duct is provided with a number of occluding members spaced circumferentially around the upstream entrance to the scavenge duct so as to restrict the entrance area of the duct. The occluding members are each generally triangular in section, are each attached to the wall of the vortex tube, and taper upstream from the entrance to the scavenge duct.

5 Claims, 1 Drawing Sheet form # 1

PARTICLE SEPARATION

FIELD OF THE INVENTION

This invention concerns improvements in or relating to particle separation, and in particular relates to a means for improving the particle separation efficiency of, and reducing pressure losses in, a vortex tube.

BACKGROUND OF THE INVENTION

Gas turbine engines in aircraft such as helicopters which may be required to perform in dusty or sandy conditions are usually fitted with devices designed to separate incoming particles from an airstream entering the engine. Such particles entering the engine can cause damage to engine parts, thus creating potentially hazardous situations, and in any event may reduce the efficiency of the engine.

One type of device commonly used to separate particles from an incoming airstream is a vortex tube. An example of a known vortex tube is illustrated schematically in FIGS. 1 and 2 of the accompanying drawings, wherein FIG. 1 shows a longitudinal section through a vortex tube 10 and FIG. 2 shows a cross-section through the tube of FIG. 1 taken at line II—II.

The vortex tube 10 of FIGS. 1 and 2 operates by providing stationary swirl vanes 12 within a cylindrical air intake 14. The swirl vanes 12 are designed to impart a swirling, or vorticular, motion to the incoming airstream of contaminated air (shown by shaded arrow 6). Centrifugal forces brought about by the swirling motion act on particles entrained in the airstream and impart radial motion to these particles whereby they travel radially outwards to a scavenge annulus 16 at a downstream end 18 of the vortex tube 10 as an exit airstream of dirty air (shown by black arrow 7). The particles are directed from the scavenge annulus 16 into the ambient airstream outside the vortex tube 10. The remainder of the airstream within the vortex tube 10, now substantially free of particles (as indicated by white arrow 8), is directed to an axial exit tube 20 leading to the engine.

For efficient operation of a vortex tube the ratio of the cross-section area of the exit tube 20 at line II—II to the cross-section area of the scavenge annulus 16 at line II—II should be about 9:1. However, this ratio is in practice reduced to considerably less than 9:1, perhaps to a ratio approaching 1:1, and this in turn leads to a tendency for the air flow to separate immediately upstream of the scavenge annulus 16 at region 22 within the vortex tube (FIG. 1). This separation of the flow causes high pressure loss and reduces separation efficiency.

It is an object of the present invention to reduce high pressure loss in the vicinity of the scavenge annulus or, alternatively, to increase air flow through the vortex tube at constant pressure loss.

SUMMARY OF THE INVENTION

According to the present invention there is provided a vortex separator for separating particulate matter from a gas stream, the separator comprising:

a tube defining a gas flow passage having an upstream inlet section and a downstream outlet section, at least one vane disposed in the region of the upstream section of the tube for imparting vorticular motion on a gas flow entering the tube, flow dividing means disposed in the region of the downstream section of the tube and radially spaced from the tube, said flow dividing means defining with the tube a pair of radially spaced axial flow outlets, and at least one occluding member located upstream of a radially outer one of said axial flow outlets so as partially obstruct gas flow entering said radially outer flow outlet.

Preferably the flow dividing means is annular and extends coaxially with the downstream section of the tube.

The flow dividing means ring may extend at least partially within the downstream section of the tube.

Preferably, the at least one occluding member extends upstream from the flow dividing means and tapers in an upstream direction away from the flow dividing means. The at least one occluding member may be attached to an interior surface of the tube.

Preferably, the at least one occluding member is of generally triangular cross-section.

Preferably, there is provided a plurality of said occluding members spaced circumferentially around the the tube upstream of the flow dividing means.

Preferably, the plurality of occluding members are dimensioned so that the ratio of the cross-section area of the occluded axial outlet at its upstream end, to the cross-section area of the non-occluded axial outlet is about 1:9.

Preferably, adjacent occluding members abut at the upstream end of the radially outer flow outlet.

The invention will now be described by way of example only with reference to FIGS. 3–6 of the accompanying non-scale schematic drawings in which,

DETAILED DESCRIPTION OF THE PREFERRED EMBODIMENT

Figure 1:
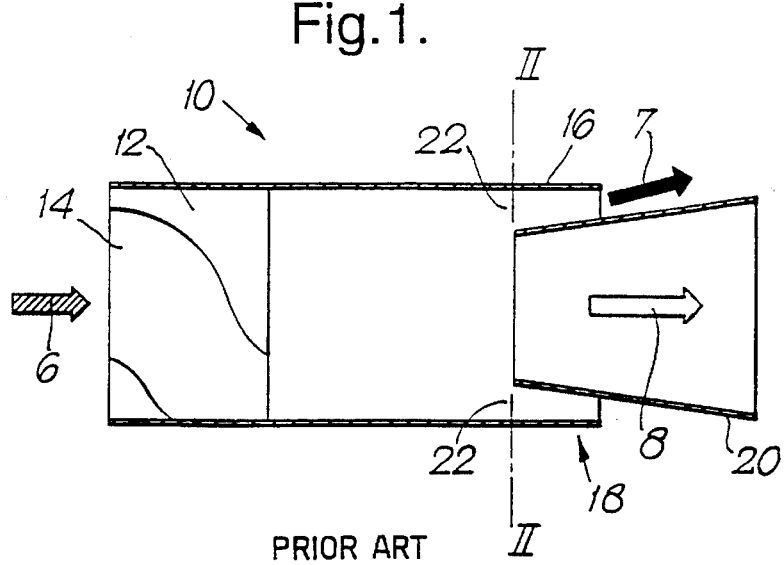
FIG. 1 is a longitudinal section through a vortex tube of the prior art.
Figure 2:
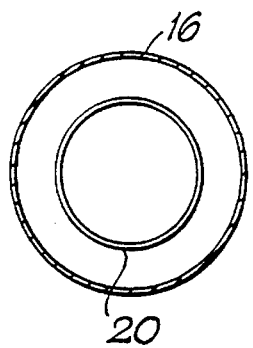
FIG. 2 is a cross-section through the tube of FIG. 1 taken at line II—II.

The prior art vortex tube of FIGS. 1 and 2 has been discussed above.

Figure 3:
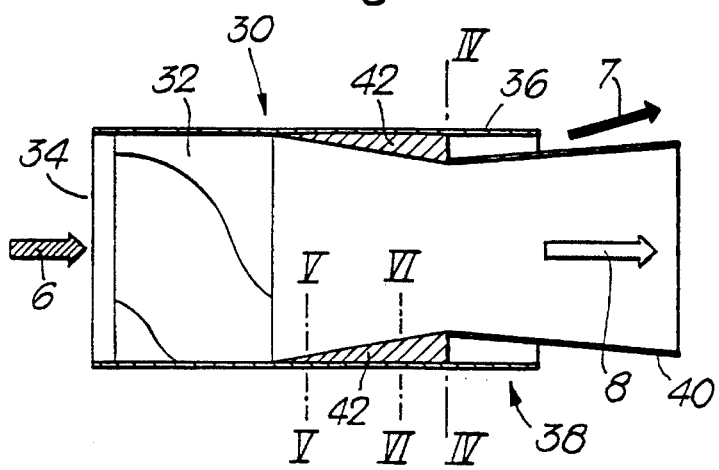
FIG. 3 is a longitudinal section through a vortex tube according to the invention.

Referring now to FIGS. 3 to 6, there is shown in FIG. 3 a vortex tube 30 according to the invention.

The vortex tube 30 is provided with stationary swirl vanes 32 within a cylindrical air intake 34. As in the vortex tube of FIGS. 1 and 2, the swirl vanes 32 of FIG. 3 are designed to impart a swirling or vorticular motion to the incoming airstream, thereby causing particles entrained in the airstream to move radially outwards to an annular scavenge duct 36 at the downstream end 38 of the tube 30. As in the prior art of FIGS. 1 and 2, the particles entering the scavenge duct 36 are eventually drawn therefrom into the ambient airstream surrounding the vortex tube, while clean air passes into an axial exit tube 40 leading to the engine. It will be noted that the swirl vanes 32, air intake 34, scavenge duct 36, and exit tube 40 perform the same functions as corresponding features 12, 14, 16 and 20 of FIGS. 1 and 2.

It will be noted that the contaminated, dirty, and clean airstreams are indicated in FIG. 3 (as in FIG. 1) by numerals 6, 7, and 8 respectively.

Located immediately upstream of the entrance to the scavenge duct 36, spaced circumferentially therearound, and partially blocking the scavenge duct entrance area, are a number of occluding members 42. Each occluding member 42 is an elongated gas guiding device extending and tapering longitudinally upstream away from the scavenge duct 36 to the swirl vanes 32. Each member 42 is of generally triangular cross-section and is attached along one face to the interior surface of the vortex tube 30. At the entrance to the scavenge duct 36, the edges of adjacent occluding members 42 abut. The tapering of the occluding members 42 is illustrated particularly in FIGS. 3, 5 and 6.

Figure 4:
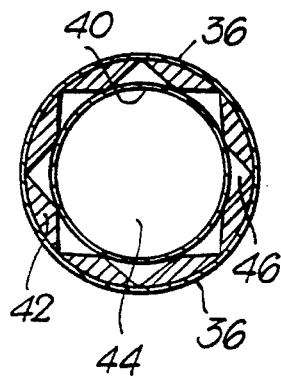
FIG. 4 is a cross-section through the tube of FIG. 3 taken at line IV—IV.
Figure 5:
FIG. 5 is a cross-section of part of the tube of FIG. 3 taken at line V—V.
Figure 6:
FIG. 6 is a cross-section of part of the tube of FIG. 3 taken at line VI—VI.

The dimensions of the occluding members 42 are specified so that at cross-section IV—IV (which indicates the entrances to scavenge duct 36 and clean air exit tube 40, as shown in FIGS. 3 and 4), the ratio of the clean air area 44 (FIG. 4) to the total scavenge area 46 (FIG. 4) is as close as possible to the optimum 9:1 ratio. The occluding members 42 are shaped so as to provide good air flow with a minimum of turbulence.

It is found that the invention, by partial blocking of the scavenge duct 36, provides an engine/scavenge area ratio close to the theoretic 9:1 flow split without causing undue pressure loss or reduction in flow through the vortex tube.

In other embodiments of the invention, not illustrated, the cross-section profile of the occluding members 42 may be other than triangular, e.g. part circular or sinusoidal. Although adjacent occluding members 42 are depicted in FIG. 4 as having abutting edges at line IV—IV, this need not necessarily be the case, and there could be gaps between the members at this point.

I claim:

1. A vortex separator for separating particulate matter from a gas stream, the separator comprising:

a first tube defining a gas flow passage having an upstream inlet section and a downstream outlet section, at least one vane disposed in the region of the upstream section of the tube for imparting vorticular motion on a gas flow entering the tube, flow dividing means formed by an exit tube disposed co-axially with the downstream outlet section of the first tube and spaced radially inwards thereof to form an outer annular scavenge duct and inwardly thereof a co-axial clean flow outlet, and a plurality of elongate tapering occluding members located against the wall of the first tube and extending upstream of the annular scavenge duct so as to partially obstruct gas flow entering said annular scavenge duct.

2. A vortex separator as claimed in claim 1 wherein there is provided a plurality of said occluding members spaced circumferentially around the tube upstream of the flow dividing means.

3. A vortex separator as claimed in claim 2 wherein adjacent occluding members abut at the upstream end of the radially outer flow outlet.

4. A vortex separator as claimed in claim 1, wherein the occluding members generally have triangular cross-sections transverse to the axial direction of the ducts.

5. A vortex separator as claimed in claim 2, wherein the plurality of occluding members is dimensioned so that the ratio of the cross-section area of the partially occluded annular scavenge duct outlet to the cross-section area of the non-occluded clean flow outlet is about 1:9.

* * * * *